(12) United States Patent
Searle

(10) Patent No.: US 6,397,082 B1
(45) Date of Patent: *May 28, 2002

(54) BEAMED ANTENNA SYSTEM

(75) Inventor: Jeffrey Graham Searle, Devon (GB)

(73) Assignee: Nortel Networks Limited, St. Laurent (CA)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/849,084

(22) PCT Filed: Nov. 23, 1995

(86) PCT No.: PCT/GB95/02736

§ 371 (c)(1),
(2), (4) Date: Jul. 14, 1997

(87) PCT Pub. No.: WO96/17486

PCT Pub. Date: Jun. 6, 1996

(30) Foreign Application Priority Data

Nov. 28, 1994 (GB) ............................................. 9424121

(51) Int. Cl.⁷ ................................................. H04B 1/38
(52) U.S. Cl. ...................................... 455/562; 455/434
(58) Field of Search ............................... 455/561, 562, 455/422, 434, 443, 517, 524, 525, 13.3, 25; 342/373, 374, 457

(56) References Cited

U.S. PATENT DOCUMENTS

| | | | | |
|---|---|---|---|---|
| 5,551,060 A | * | 8/1996 | Fujii et al. .................. | 455/562 |
| 5,570,098 A | * | 10/1996 | Searle et al. ................. | 342/374 |
| 5,596,333 A | * | 1/1997 | Bruckert ...................... | 455/522 |
| 5,603,089 A | * | 2/1997 | Searle et al. ................. | 455/562 |

OTHER PUBLICATIONS

Kerr, Douglas, "Cellular Telephone Technology and Practice", Patent Academy USPTO, pp. 7–11, 1986.*

* cited by examiner

Primary Examiner—Doris H. To
(74) Attorney, Agent, or Firm—Lee, Mann, Smith, McWilliams Sweeney & Ohlson

(57) ABSTRACT

A radio communication system (10) is disclosed which comprises a base station (12) for transmitting and receiving signals to and from one or more remote stations (16). The base station (12) is provided with at least one receive antenna (14) coupled to a base station receiver. The receive antenna (14) is provided with a directional pattern in a horizontal plane and a mechanism for steering the directional pattern azimuthly, until such time as a synchronization signal transmitted by a remote station located within the coverage area is received by the base station receiver. Upon detection of the synchronization signal, scanning of the receive antenna's pattern is stopped until such time as message information can be obtained from the remote station (16) and forwarded to a particular destination requested by the remote station. Upon receiving the information, the base station (12) will resume scanning of the antenna (14), and the information will be forwarded to its requested destination.

6 Claims, 6 Drawing Sheets

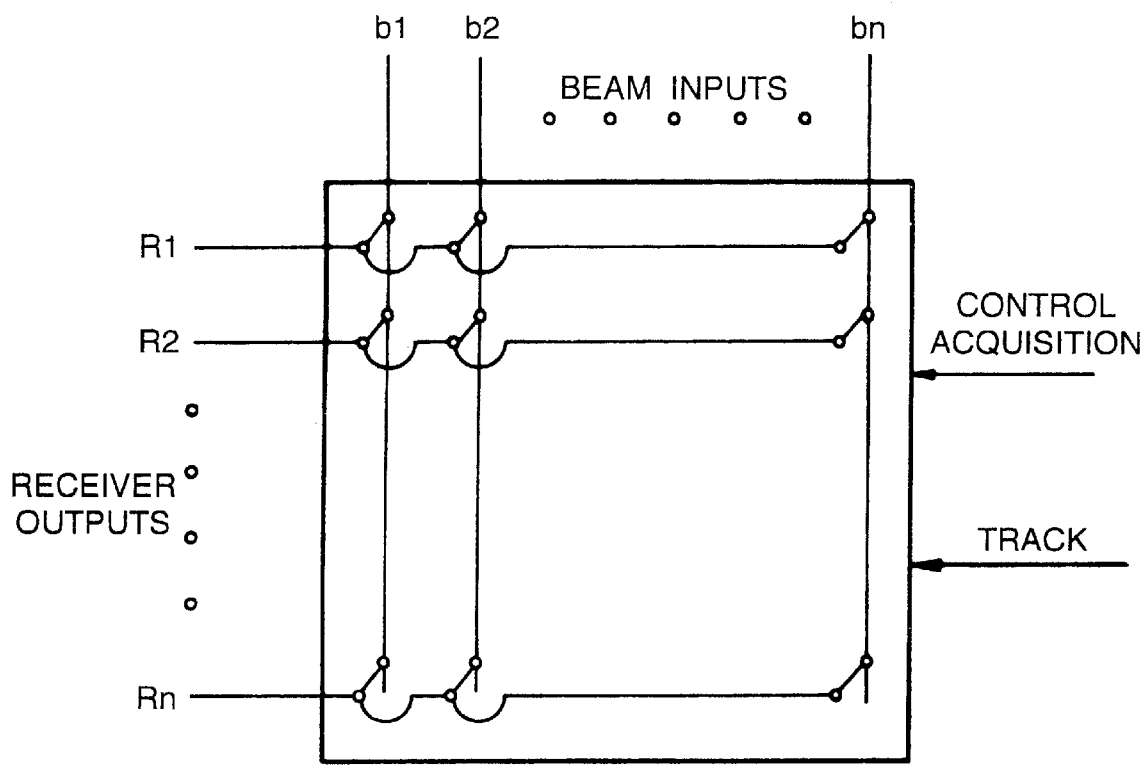

FIXED BEAMS

BEAMED ANTENNA SYSTEM

FIELD OF THE INVENTION

This invention relates to a beamed antenna system and in particular relates to the operation of a broadcast control channel as used in cellular radio communications systems so as to provide omni-coverage characteristics.

BACKGROUND OF THE INVENTION

Cellular Radio systems are used to provide telecommunications to mobile users. In order to meet with capacity demand, within the available frequency band allocation, cellular radio systems divide a geographic area to be covered into cells. At the centre of each cell is a base station, through which the mobile stations communicate. The available communication channels are divided between the cells such that the same group of channels are reused by certain cells. The distance between the reused cells is planned such that co-channel interference is maintained at a tolerable level.

When a new cellular radio system is initially deployed, operators are often interested in maximizing the uplink (mobile station to base station) and downlink (base station to mobile station) range. The range in many systems are uplink limited due to the relatively low transmitted power levels of hand portable mobile stations. Any increase in range means that less cells are required to cover a given geographical area, hence reducing the number of base stations and associated infrastructure costs. Similarly, when a cellular radio system is mature the capacity demand can often increase, especially in cities, to a point where more smaller size cells are needed in order to meet the required capacity per unit area. Any technique which can provide additional capacity without the need for cell-splitting will again reduce the number of base station sites and associated infrastructure costs.

Typically, in a cellular communication system, an array of antennas is provided at each cellular base station site for providing communications to randomly distributed mobile stations, in a given area. Each base station site has a plurality of sectored antennas for providing a plurality of communication channels. A predetermined number of sites are used to constitute a sub-array of cells to provide a set of communication channels and channel allocations are repeated from subarray to subarray. Channels are allocated per sub-cell so as to minimize channel interference. Each antenna is thus required to subtend an arc of, typically, 60° or 120°, depending on the number of antenna arrays employed.

The sectorised approach to the use of directional antennas is currently at its useful limit at 60° beamwidth. The key disadvantages of this sectorised approach are: The radio transceivers at each cell site are dedicated to particular sectors which leads to significant levels of trunking inefficiency—in practice this means that many more transceivers are needed at the base station site than for an omni-directional cell of the same capacity, and each sector is treated by the cellular radio network (i.e. the base station controller and mobile switches) as a separate cell. This means that as the mobile moves between sectors, a considerable interaction is required between the base station and the network to hand off the call between sectors of the same base station. This interaction, comprising signalling and processing at the base station controller and switch, represents a high overhead on the network and reduces capacity.

The antenna used at the base station site can potentially, make significant improvements to the range and capacity of a cellular radio system. Each cell has a single broadcast control channel that is assigned to a single frequency and is transmitted from the base station.

The base stations use the broadcast channel to identify themselves as a base station, either as the primary station in the area or, as an additional station to the one currently in use. Each mobile station will take signal strength measurements from all the broadcast channels it can receive. This information will be employed so that an optimum signal strength is received at all times and this data is employed for use in handover algorithms, on change of base station or sector covered by a particular base station. A good base station antenna pattern is a beam of narrow angular width, in both the azimuth and elevation planes. The narrow beam is directed at the wanted mobile and tracks the mobiles movements. This ensures that the mobile station is always connected to the most appropriate base station or setor. It is from the broadcast channel that a mobile station learns which frequency to use to contact the base station and when the base station has an incoming call for the mobile station. The broadcast channel is a fundamental element in a cellular radio system.

The use of cellular radio systems is governed by certain protocols some of which, for example the GSM protocol, require each broadcast channel to be transmitted continuously over the entirety of the cell. Such a constriction is very demanding for the rapidly emerging systems that utilise the concept of multiple narrow beams for the conveyance of traffic channels. These systems with their high gain narrow beams can give greater range coverage without requiring larger sized power amplifiers. Existing narrow beam systems can produce a nominally omni-directional broadcast channel in one of two ways: All of its beams can be transmitted simultaneously. This can result in phase problems—not only with the base station, but also with neighbouring base stations. An additional omni-directional antenna can be used but the disadvantage of the omni antenna is that it has a significantly lower gain than a narrow beam antenna, and thus to cover the same range as the traffic channels the omni antenna requires a significantly higher power amplifier. WO94/11956 (South Western Bell) provides a base station antenna arrangement with a dedicated control channel antenna which sweeps the area of coverage of the cell.

SUMMARY OF THE INVENTION

The present invention seeks to overcome or reduce the problems associated with the use of omni-directional antennas as described above.

According to the present invention there is provided a radio communications base station antenna arrangement comprising a number of antenna apertures capable of forming a plurality of beams, wherein traffic and control channels share the same antenna apertures, and wherein selection means are provided capable of assigning a single control channel consecutively via one or more of these beams such that its area of coverage sweeps around the cell during a given period of time. The area of coverage can be around the whole or part of the cell. Preferably there is also provided means at the mobile station to isolate control information. Preferably signal strength measurements are conducted on burst type signals appearing at random intervals of time whereby a maximum period between bursts can be determined.

In accordance with another aspect of the invention there is provided a method of operating a radio communications base station antenna arrangement wherein the broadcast signal is provided in a narrow beam and which narrow beam sweeps around the whole or part of a cell during a given period of time, which broadcast signal is emitted through the same antenna aperture as traffic channels.

BRIEF DESCRIPTION OF THE DRAWINGS

Embodiments of the invention will now be described with reference to the accompanying drawings, in which:

FIG. 3 illustrates the basic principle of a switching matrix;

DETAILED DESCRIPTION

Figure 1:
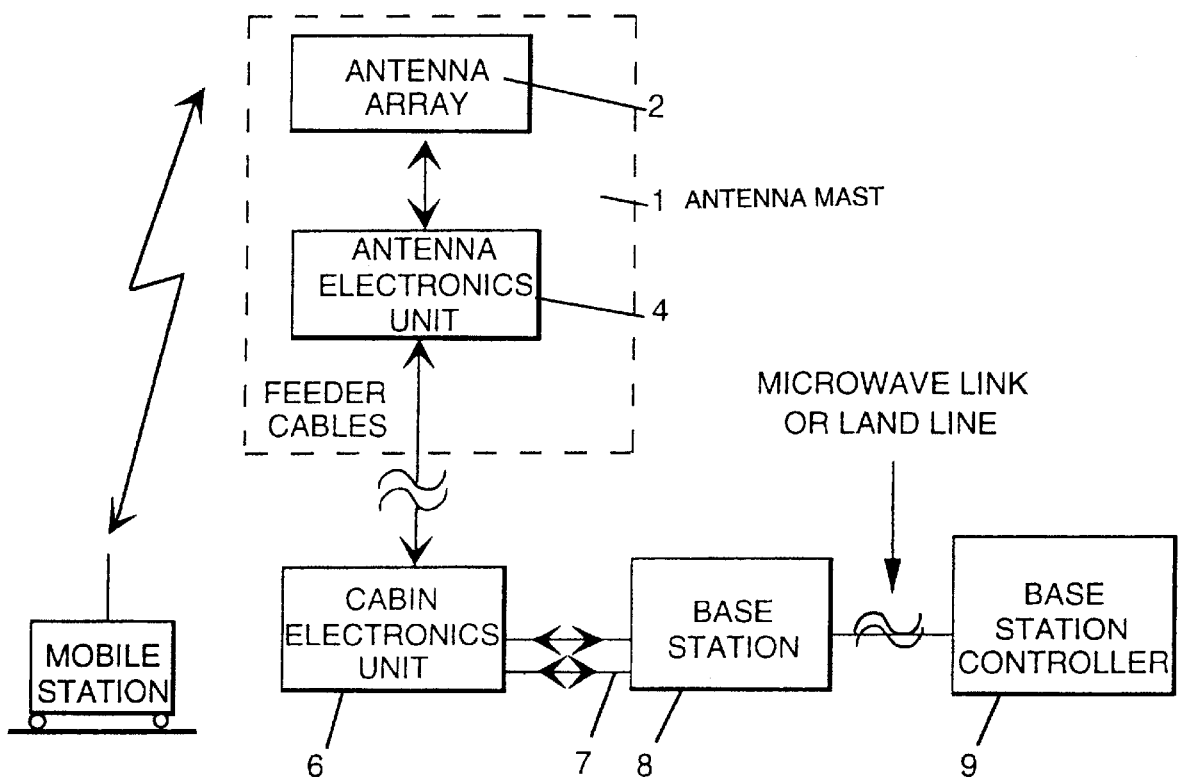
FIG. 1 is a block diagram of the main elements of a base station.

The main elements of a base station antenna arrangement as shown in FIG. 1 comprise a mast tower or building 1 supporting the antenna array(s) 2 and associated antenna electronics unit 4, which includes beamformers, diplexers and amplifiers. The antenna electronics unit 4 is connected via a cabin electronics unit 6 to the base station 8 by means of link 7. The base station is under the control of a base station controller 9.

Figure 2A:
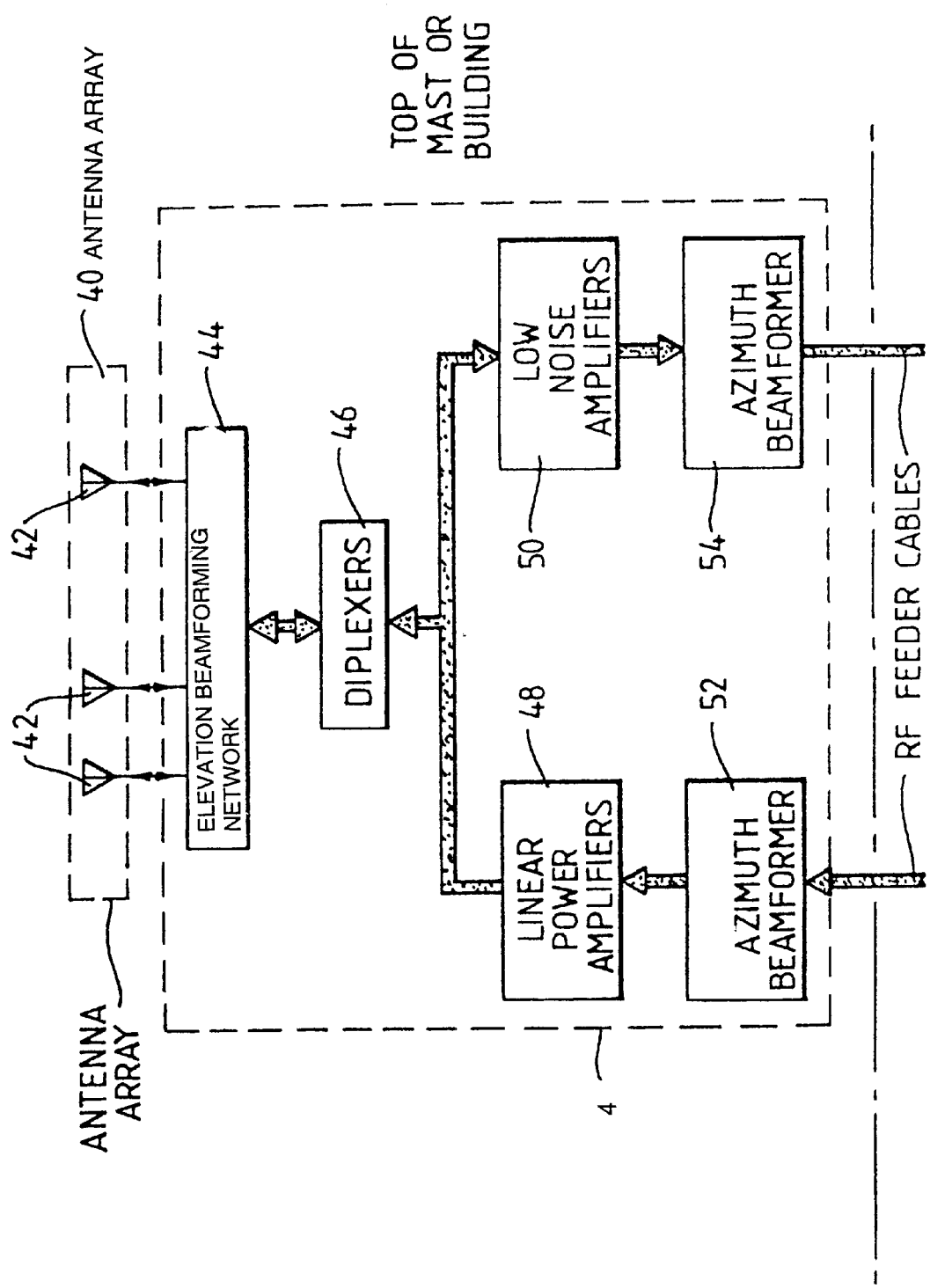
FIGS. 2(a) and 2(b) show the constituents of a multiple narrow beam base station.
Figure 2B:
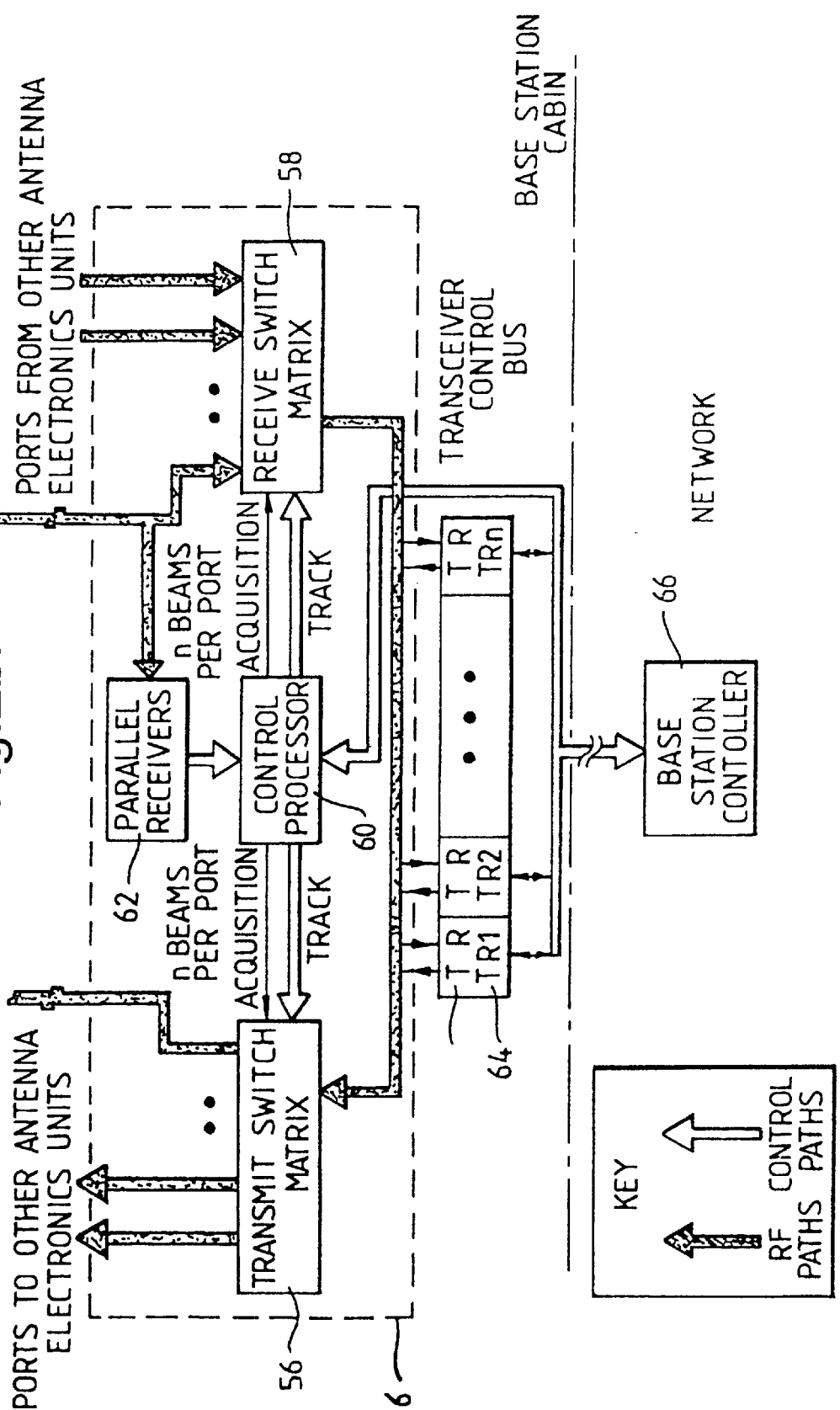

The components of the base station antenna arrangement are detailed in FIGS. 2(a) and 2(b). Only one of the antenna arrays is depicted. Each antenna array 40 comprises a conventional array of individual antenna elements 42 arranged in rows and columns. Each column of elements is energised via an elevation beamforming network 44. Each elevation beamforming network combines the elements of a column to a single feed point. The amplitude and phase relationships of the r.f. signals coupled to the elevation beamformer determine the elevation beam pattern of the antenna for both transmit and receive. The transmit and receive signals for each elevation beamformer are coupled to the beamformer via individual diplexers 46. Filters which cover just the transmit or receive frequency bands respectively can be used for this purpose. In the transmit path the diplexers 46 are fed from separate linear power amplifiers 48, one for each elevation beamformer. These amplify the r.f. signals up to the power levels required for transmission. The power amplifiers need to have high linearity since the signals from every transmitter pass through the amplifiers simultaneously without producing significant intermodulation products. In the receive path the diplexers 46 feed separate substantially identical low noise amplifiers 50, one for each elevation beamformer. The low noise amplifiers are required to amplify the weak received r.f. signals prior to any system losses to establish a low noise figure (high sensitivity) in the subsequent receive path.

The linear power amplifiers are in turn connected to the outputs of azimuth beamformers 52, one for each array. The azimuth beamformers have multiple output ports, one for each elevation beamformer, via the relevant linear power amplifier. The phase and amplitude relationship of the outputs to the beamformers control the azimuth beam pattern from the array. The beamformer has multiple input ports each of which provides a different azimuth beam in space. Likewise the receive path has a corresponding azimuth beamformer 54 for each array. This combines the multiple inputs from the elevation beamformers via the low noise amplifiers to provide multiple outputs each for a different azimuth beam in space. The phase and amplitude relationships used in the combination process control the azimuth beam shapes. The transmit and receive azimuth beamformers are substantially identical circuits used in a reciprocal manner. One well known type of beamformer is the Butler matrix.

Signals are passed to and from the azimuth beamformers by transmit and receive switch matrices 56 and 58. Each switch matrix comprises an r.f. cross-bar switch which allows any of its inputs to be connected to any of its outputs. The switch matrix design is such that any number of transmitters or receivers can be connected simultaneously to any one beamformer port. Thus, if necessary, all the transmitters can be connected to one beam port at a given time. Likewise all the receivers can be connected, if necessary, to the same beam port at the same time. The switch matrices are operated under the control of a control processor 60. A typical switch matrix structure is illustrated in FIG. 3. A bank of parallel receivers 62, one for each beam, allow every receive channel to be monitored on every beam simultaneously. For each channel the receivers measure the quality of the wanted mobile station signal present on each beam. The information on which is the 'best'beam is passed to the control processor. The quality measure used by the receivers will vary depending on the particular cellular system concerned. In simple, cases the measure will be the highest power level in other cases carrier to interference ratio will be used. The basic function of the control processor 60 is to control the transmit and receive switch matrices such that the best beam (normally the one pointing at the mobile stations geographic position) for a given channel is selected. The inputs to the control processor are the beam quality data from the parallel receivers and in some cases data from the transceiver control bus within the base station. The latter allows the control processor to monitor a given mobile station's assignment to various control and traffic channels in the system during the progress of a call. Knowledge of which channel the mobile is being moved to allows a prompt and non-disruptive assignment to the best beam. The control algorithms used will fall into two basic classes, one for initial acquisition of the best beam for a new call and one for tracking of the best beam when a call is in progress. It is anticipated that due to different multipath conditions the parameters within the control algorithms will vary for rural and urban cells. The determination of beam selection on the uplink is used to select the corresponding beam for the downlink. The switch matrices are coupled by r.f. bus paths to the bank of transceivers 64, one for each channel to be provided by the base station. The transceivers are operated under the control of the base station controller 66, which also provides overall control for the switch matrix control processor 60.

Figure 4:
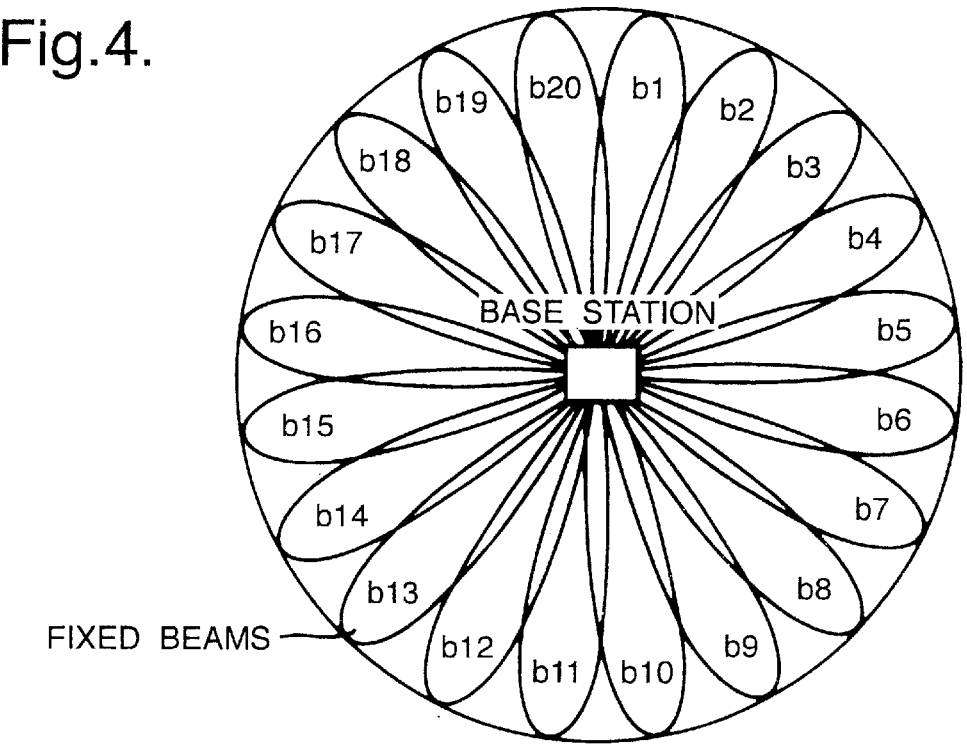
FIG. 4 shows a multiplicity of narrow, overlapping beams covering the cell area surrounding a base station.
Figure 5:
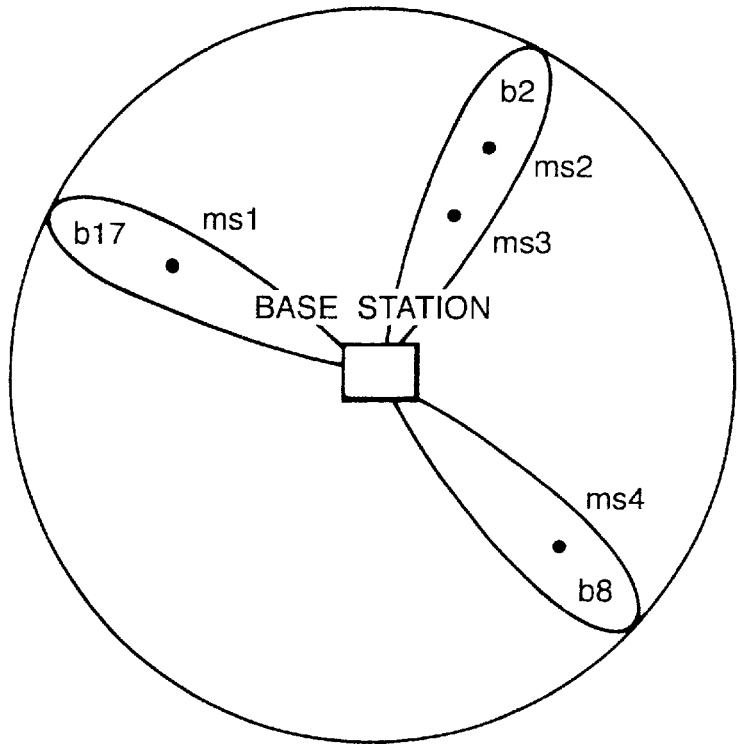
FIG. 5 shows how mobile stations are served by the narrow beams of FIG. 4.

FIGS. 4 and 5 illustrate the system operation. FIG. 4 shows the concept of a multiplicity of narrow, overlapping beams covering the cell area surrounding the base station. The beams are referenced b1–b20 FIG. 5 shows how, at time $t_1$ four mobile stations ms1–ms4 are served by beams b2, b8 and b17. Beam b2 serves two mobile stations ms2 and ms3; b4 serves ms3; and b8 serves ms4. When a mobile station moves out of the cell coverage of this base station, such a mobile station will be served by an adjoining base station (not shown).

Figure 6:
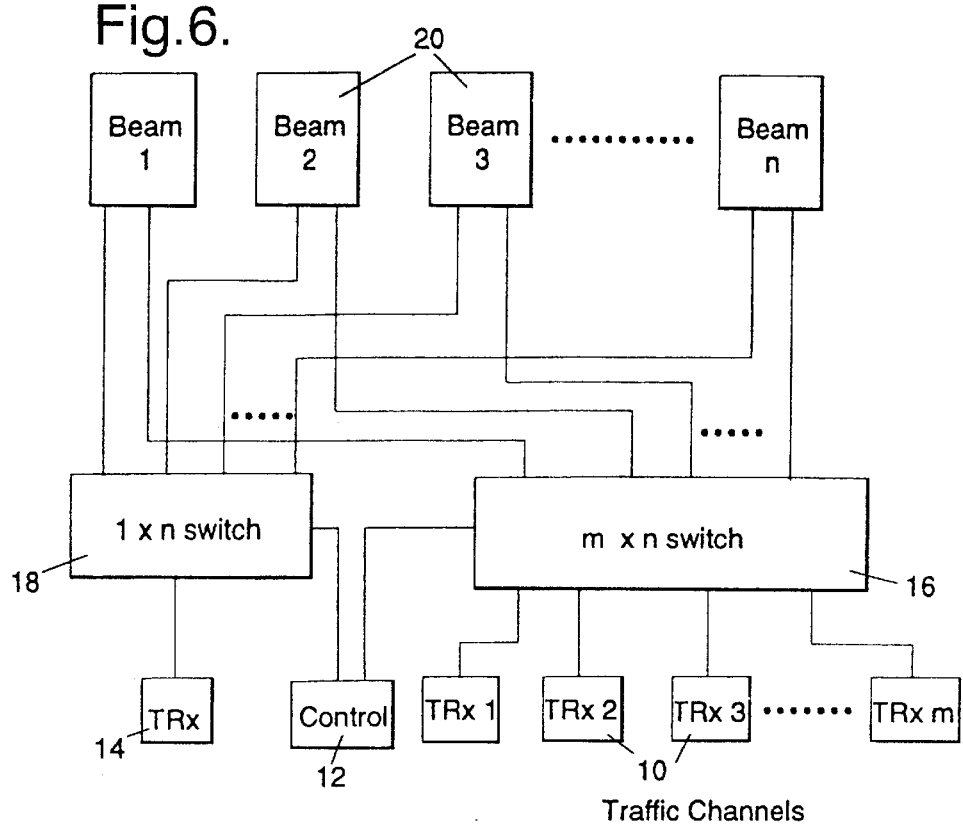
FIG. 6 shows a first embodiment of the invention.

Referring now to FIG. 6, traffic transceivers TRx 1 . . . m are connected via a multi-way switch 16 to each of the antennas which provide beams 1–n such that each traffic transceiver can cover the area subtended by any beam. The broadcast control channel transceiver 14 is connected to an n-way switch 18 where n defines the number of beams in the system. The outputs from the switch are connected one to each beam 20. Depending upon the amplification arrangements, the beams will be either capable of transmitting at least one traffic channel as well as the control channel or the control channel can only be transmitted in a beam that does not have any traffic in that time slot.

The dwell time for the broadcast channel in each beam will depend on the type of messages to be transmitted, but ideally would be based on the time slot framework such that the control channel is not switching in mid time slot.

Figure 7:
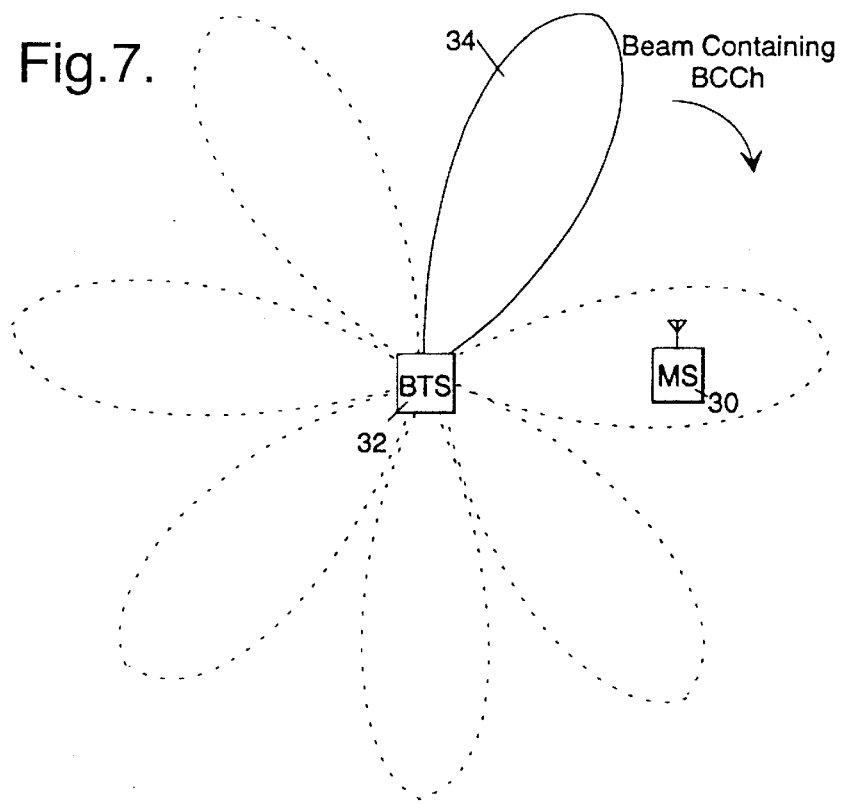
FIG. 7 shows a base transmitter station transmitting an omni coverage beam.

The mobile 30 as depicted in FIG. 7 will only receive the broadcast channel for a proportion of the time, when the mobile is in the beam 34 selected by the base station 32 to broadcast the control channel. The time interval between receiving a broadcast control channel and the next one will vary as the mobile station moves between beams. The mobile station also has to contend with the scenario of receiving two consecutive broadcasts as the mobile moves from a cell covered by one base station covered by an adjacent base station, in the area of cell overlap.

One advantage of this invention lies in its ability to provide a control channel to the whole cell simultaneously with traffic transmissions through the same antenna aperture. As current methods require either a separate omni-directional antenna with a high power amplifier or the ability to simultaneously transmit all beams, this method offers simplicity of equipment with lower power consumption higher reliability and lower maintenance costs.

The ratio gains of antennas of different beam widths is approximately equal to the ratio of these beam widths, with the narrower beam having the higher gain. Consider the following example of a narrow beam system using 10% beamwidth traffic antenna:

$$\frac{G_{beam}}{G_{omni}} \approx \frac{360}{10} = 36 = 15.6 \text{ dB}$$

Therefore as the gain of the narrow beam antenna is approximately 36 times greater than the gain of the omni-directional antenna, the power amplifier in the omni path would need to be 36 times the power of the one in the traffic path, in order to cover the same range. Thus for a 25 watt traffic amplifier a 900 watt omni-directional amplifier would be required. This would have a significant impact on the cost, power consumption, power dissipation and reliability of the base station in addition to the size and weight of the transmitter that may require installation at the top of a mast.

What is claimed is:

1. A base station antenna arrangement comprising:

means for forming a plurality of narrow beam patterns for exchanging radio frequency signals with a plurality of mobile stations;

and means for transmitting a downlink common control signal in each said beam pattern; wherein said common control signal transmission means comprises selection means arranged to switch said control signal to one beam pattern at a time.

2. A base station arrangement according to claim 1 wherein said common control signal transmission means is arranged to transmit said control signal consecutively into adjacent beam patterns such that said signal rotates about said base station in a predetermined period.

3. A base station antenna arrangement as claimed in claim 1 wherein said control signal is transmitted simultaneously with traffic signals through the same antenna aperture.

4. A method of operating a base station comprising means for forming a plurality of narrow beam patterns for exchanging radio frequency signals with a plurality of mobile stations; said method comprising:

switching a downlink common control signal between a plurality of said beam patterns such that said control signal is transmitted in one beam pattern at a time.

5. A method as claimed in claim 4 wherein said control signal is transmitted consecutively into adjacent beam patterns such that said signal rotates about said base station in a predetermined period.

6. A method as claimed in claim 4 wherein said control signal is transmitted simultaneously with traffic signals through the same antenna aperture.

* * * * *